3,251,055
SOLID STATE ANALOG TO DIGITAL DISPLAY SCANNER

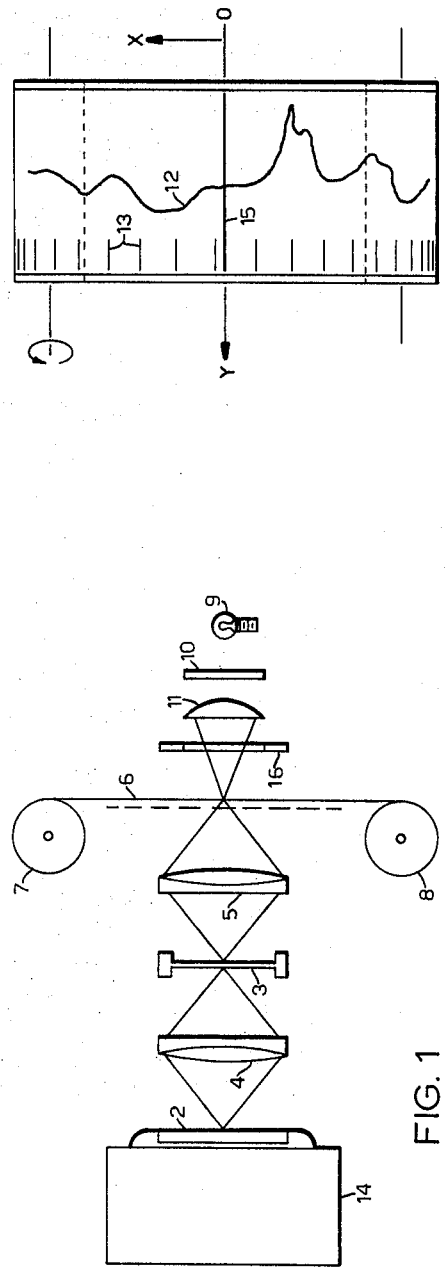
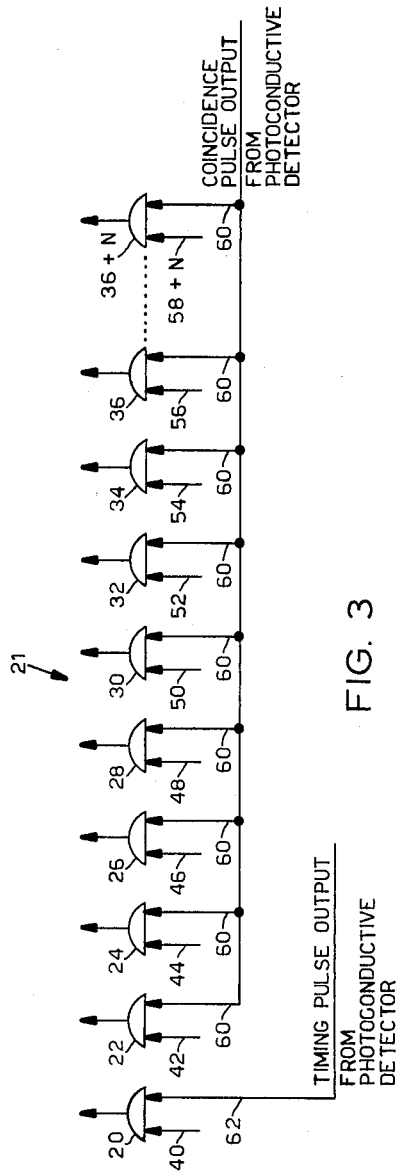

Robert B. McIntosh, Jr., New York, N.Y., and Martin S. Maurer, Roslyn, Pa., assignors to General Precision Inc., Little Falls, N.J., a corporation of Delaware
Filed Aug. 26, 1963, Ser. No. 304,414
12 Claims. (Cl. 340—347)

The present invention relates to the conversion of analog information to digital information, and more particularly to an optical scanning device for directly producing a digital representation of an analog function.

It is often desirable to digitize analog functions recorded on recording paper, strip charts, cathode ray tubes or similar types of display device. Prior to the present invention, this was accomplished by what may be referred to as a function scanner which first had to obtain a representation of the function in analog form and then convert the representation to digital form by some analog to digital conversion technique. Because of the indirect process used, the prior function scanners were subject to considerable error and noise.

The present invention provides a scanning device which can directly represent an analog function in digital form. In accordance with one embodiment of the invention, an analog function in the form of a transparent line on a continuously moving opaque strip chart is exposed on one side to an illuminated line extending across the width of the strip chart parallel to the Y-coordinate of the function thereon. A pinpoint beam of light passes through the chart at the intersection of the illuminated line and the function, and the position of the pinpoint light beam is varied linearly back and forth across the strip chart in accordance with the amplitude variations of the function by simply advancing the strip chart along the X-coordinate of the function. A suitable lens is provided for focusing the pinpoint light beam on one face of a photoconductive detector, and an optical light scan is focused on the opposite face of the detector. The light scan is made up of discrete light pulses repetitively swept across the width of the detector. Whenever a scan light pulse comes into coincidence with the pinpoint light beam focused on the opposite face of the detector, an electrical coincidence output is produced by the detector. By knowing which line was energized in the panel to produce the discrete light pulse in the group of pulses making up each line sweep across the detector when the coincidence detector output occurs, information is obtained in digital form of the Y-coordinate value of the function on the strip chart. Repetitive sweeping of the detector by the optical light scanner in conjunction with the strip chart movement and timing lines superimposed on the strip chart along the X-coordinate can completely represent the recorded function in digital form to high degrees of accuracy.

Accordingly, it is one object of the invention to provide a scanning device for directly producing a digital representation of the analog function being scanned.

It is another object of the invention to provide a scanner for digitizing analog data with a high degree of resolution at large sampling densities.

It is a further objection of the invention to provide a scanner for producing a digital representation of the function being scanned wherein the digital representation can be directly used to produce a visual readout in digital form or be stored in a computer memory, on tape or on punched cards.

It is a still further object of the invention to provide a device for digitizing functions recorded on recording paper, strip charts, cathode ray tubes or similar types of display devices.

Other objects and features of novelty of the present invention will be specifically pointed out or will otherwise become apparent when referring, for a better understanding of the invention, to the following description taken in conjunction with the accompanying drawings, wherein:

FIG. 1 is a side view in elevation of the elements of a scanning device embodying features of the present invention;

FIG. 2 is a view of the front face of the strip chart being scanned in FIG. 1 illustrating the analog function recorded thereon; and FIG. 3 is a schematic view of a logic circuit for interpreting the output pulses of the scanning device illustrated in FIG. 1.

Referring to FIG. 1, a solid state optical scanner is shown which comprises an electroluminescence panel 2 of high resolution. The panel is positioned on the right face of a housing 14 which contains the electronics for the panel. The panel 2 is well known in the art and produces an optical light scan which is focused on the left face of a photoconductive detector 3 by a suitable lens 4. The light scan consists of a repeating line sweep across the width of the detector with each sweep being made up of a plurality of discrete light pulses each of which produce short illuminated lines of light on the left face of the detector perpendicular to the direction of the line sweep. A strip chart 6 is continuously advanced across the right face of the photoconductive detector from a feed reel 7 to take-up reel 8, the line of movement of the chart being perpendicular to the line sweep of the optical light scan. The strip chart consists of a transparent strip of suitable material such as film which has been made opaque by a thin coating such as an emulsion. A function 12 is recorded on the film by a pointer or stylus which etches the function on the strip by pressure, heating or a similar process using standard recording techniques to remove the opaque coating to form a transparent line.

An illuminated line 15 is projected on the face of the strip chart 6 across the width thereof and parallel to the Y-coordinate of the function 12. A plurality of transparent timing lines 13 are also formed along the left edge of the strip chart to produce timing pulses which define the X-coordinate of the function as will be described. The illuminated line 15 is produced by a projection lamp 9. A screen 10 contains a small aperture 10a, which, illuminated by the projection lamp 9, is imaged to the illuminated line 15 on the face of the strip chart 6 by a cylindrical lens 11. An iris diaphragm 16 may be provided to screen out the unwanted light and assist in more clearly defining the illuminated line 15. A pinpoint light beam will pass through the strip chart at the intersection of the illuminated line 15 and the function 12, and an additional light beam will pass through the strip chart each time one of the timing lines 13 moves into alignment with the illuminated line 15. These light beams are focused by a lens 5 on the right face of the photoconductive detector 3. The pinpoint light beam produces an illuminated spot on the face of the detector which moves linearly back and forth across the width of the detector in response to variations in the amplitude of the function 12.

The photoconductive detector 3 is a sandwich type photoconductance cell well known in the art. Its construction is such as to produce an electrical coincidence output pulse whenever a discrete scan light pulse on the left face of the photoconductive detector comes into coincidence with the illuminated spot on the right face of the photoconductive detector produced by the pinpoint light beam. By knowing which line has been energized in the panel when this coincidence detector output occurs, information as to the value of the Y-coordinate of the function on the strip chart is obtained directly in digital form. Each time a timing line 13 aligns itself with the illuminated line 15, an additional illuminated timing line will appear on the right face of the photoconductive detector and a second output pulse will be produced by the detector when a scan light pulse from the panel 2 comes into coincidence with the illuminated timing line. This second output is used to provide timing pulses representative of the X-coordinate of the function 12. It is apparent that high speed repetitive sweeping of the detector by the panel 2 in conjunction with the chart movement and timing pulses can completely represent the recorder function 12 in digital form with a high degree of accuracy.

As mentioned above, the scanning light produced by the panel 2 which sweeps across the detector, is made up of discrete light pulses. These discrete light pulses are controlled by a shift register in the electronics for the panel 2 which progressively energizes particular lines in the panel 2 to produce each of the light pulses. A logic circuit 21 may be provided as illustrated in FIG. 3 for correlating the coincidence output pulses of the photoconductive detector 3 and output pulses of the shift register. The logic circuit 21 comprises a plurality of AND gates 20–36+N, one for each line of the panel. Therefore each time a line is energized to produce a discrete light pulse, an input signal is applied to the AND gate associated therewith along one of the input lines 40–58+N to enable the gates. The coincidence output of the photoconductive detector 3 is simultaneously applied to each of the AND gates along input lines 60. When the detector 3 produces a coincidence output pulse indicating that a discrete light pulse of the panel 2 has come into coincidence with the illuminated function focused on the opposite face of the detector, the AND gate which is enabled at that instant will produce an output signal indicating the value of the Y-coordinate of the function 12. Intermittently, the timing pulse outputs will be produced by the detector and applied to the AND gate 20 along an input line 62 to produce an output signal indicating the value of the X-coordinate of the function 12.

Thus the present invention provides a direct digital representation of the function 12 and eliminates the necessity of producing a representation of the function 12 and converting the representation to digital form by some analog to digital converter. Error and noise are eliminated by using the technique of the invention because it is only necessary to determine when a coincidence pulse occurs rather than continuously monitor signal changes produced by other forms of detectors and sweep techniques. In addition, any error arising from the analog to digital conversion is eliminated. The present advanced state of electroluminescence panel development allows the digital representation of a recorded analog function to be determined pursuant to the present invention with a high degree of resolution and with sampling densities far exceeding other known techniques.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims. For example in the embodiment described above each discrete light pulse from the panel 2 produces a short illuminated line on the left face of the detector 3 parallel to the X-coordinate of the function 12 and these lines, in turn, make up the sweep across the detector 3 parallel to the Y-coordinate of the function. It is apparent that the discrete light pulses from the panel 2 could be made to produce illuminated spots on the left face of the detector instead of the short lines, and that a significant part of the function itself could be displayed on the right face of the detector in place of the illuminated spot. For example, instead of focusing the illuminated line 15 on the face of the strip chart, a beam of light could be directed thereon so that the entire portion of the function exposed to the light would be illuminated on the right face of the detector 3. When the modified line sweep intersects the illuminated portion of the function on the detector 3, the coincidence output pulse will be produced as before. As the strip chart advances, the portion of the function illuminated on the detector will change and the intersection of the line sweep therewith will vary along the Y-coordinate in accordance with the amplitude of the function. With this arrangement the coincidence output pulse of the detector 3 can be applied to the logic circuit 21 in the same manner as previously described.

What is claimed is:

1. An analog to digital display scanner comprising photoconductive detector means, means for producing an illuminated spot on one face of said detector means, means for linearly varying the position of said illuminated spot in accordance with the Y-coordinate of an analog function, and means for repetitively sweeping the other face of said detector means along the line defined by the linearly varying illuminated spot with a scanning light made up of discrete light pulses, said photoconductive detector means including means for producing an output signal whenever a discrete scanning light pulse comes into coincidence with said illuminated spot.

2. The invention as defined in claim 1 including means for producing intermittent illuminated timing pulse lines on said one face of the photoconductive detector means with the time interval between said timing pulse lines being determined by the X-coordinate of said analog function, said photoconductive detector means producing a second output signal each time a discrete scanning light pulse comes into coincidence with one of said timing pulse lines.

3. An analog to digital display scanner comprising means for generating and focusing an illuminated line on a plane, photoconductive detector means, means for focusing an image of said illuminated line on one face of said detector means, means for displaying an analog function in said plane with its Y-coordinate parallel to said illuminated line, the intersection of said illuminated line and analog function producing a spot on said one face of the photoconductive detector means defined by light energy, and electroluminescence means for sweeping a scanning light across the other face of said photoconductive detector means along the image of said illuminated line, said scanning light comprising a plurality of discrete light pulses, said photoconductive detector means producing an output signal whenever one of said discrete light pulses comes into coincidence with said spot on said one face of the photoconductive detector means, and means for moving said display means along the X-coordinate of the analog function displayed thereon whereby the position of said spot on said one face of the photoconductive detector means will vary linearly in accordance with the Y-coordinate of the function.

4. The invention as defined in claim 3 wherein said display means displays said analog function as a transparent line on an opaque background and the intersection of said illuminated line and analog function produces an illuminated spot on said one face of the photoconductive detector.

5. The invention as defined in claim 4 wherein said display means comprises a transparent strip chart having an opaque coating on one face thereof with said function being recorded on said one face as a transparent line by removing the opaque coating along the line defined by the function.

6. The invention as defined in claim 3 wherein said means for generating and focusing an illuminated line comprises a light source, and cylindrical lens means interposed between said light source and said plane in position to focus the light from said light source as an illuminated line on said plane.

7. The invention as defined in claim 6 including aperture means interposed between said light source and cylindrical lens means.

8. An analog to digital display scanner comprising a light source, cylindrical lens means for focusing the light from said light source as an illuminated line on a plane, photoconductive detector means, lens means for focusing an image of said illuminated line on one face of said photoconductive detector means, means for displaying an analog function in said plane with its Y-coordinate parallel to said illuminated line, the intersection of said illuminated line and analog function producing a spot on said one face of the photoconductive detector means defined by light energy, electroluminescence means for repetitively sweeping a scanning light across the other face of said photoconductive detector means along the image of said illuminated line, each sweep of said scanning light comprising a plurality of discrete light pulses, said photoconductive detector means producing a coincidence output signal whenever one of said discrete light pulses comes into coincidence with said spot on said one face of the photoconductive detector means, and means for moving said display means along the X-coordinate of the analog function displayed thereon whereby the position of said spot on said one face of the photoconductive detector means will vary linearly in accordance with the Y-coordinate of the function.

9. The invention as defined in claim 8 wherein said display means comprises an opaque strip having the function recorded thereon in the form of a transparent line whereby a pinpoint light beam will pass through said opaque strip at the intersection of said illuminated line and transparent function line and said pinpoint light beam will produce an illuminated spot on said one face of the photoconductive detector means which linearly varies its position in accordance with the Y-coordinate of the function.

10. The invention as defined in claim 8 including a plurality of AND gates corresponding in number to the number of discrete light pulses making up a single line sweep across the photoconductive detector means, means for applying said coincidence output signal as a first input to each of said AND gates, and means for applying a second input signal to said AND gates controlled by said electroluminescence panel, said second input signal being applied to a different one of said AND gates each time said panel generates a different discrete light pulse during a single line sweep, said AND gates producing an output signal whenever said first and second input signals are applied thereto at the same time.

11. The invention as defined in claim 10 wherein said display means has transparent timing lines thereon uniformly spaced along the X-coordinate of said function and in position to pass across said illuminated line so as to produce intermittent illuminated timing lines on said one face of the photoconductive detector means, said panel generating an additional discrete light pulse each sweep across said photoconductive detector means in position to coincide with said intermittent illuminated timing lines, said photoconductive detector means producing a second coincidence output signal each time said additional discrete light pulse comes into coincidence with an illuminated timing line, an additional AND gate, means for applying an input signal to said additional AND gate each time said panel generates said additional discrete light pulse, and means for applying said second coincidence output signal to said additional AND gate, said additional AND gate producing an output signal whenever said second coincidence output signal is applied thereto.

12. An analog to digital display scanner comprising photoconductive detector means, means for repetitively sweeping one face of said detector means along a line with a scanning light made up of discrete light pulses, means for producing an illuminated figure on the other face of said detector means which coincides with said line at one spot, and means for linearly varying the position of said spot along said line in accordance with the amplitude of an analog function, said photoconductive detector means including means for producing an output signal whenever a discrete scanning light pulse comes into coincidence with said spot.

No references cited.

DARYL W. COOK, *Acting Primary Examiner.*

W. J. ATKINS, *Assistant Examiner.*